May 22, 1951 — H. B. RUDOLPH — 2,554,348
SHEAVE ASSEMBLY
Filed Dec. 1, 1947 — 2 Sheets-Sheet 1

Inventor
Henry B. Rudolph
Joe E. Edwards
Attorney

May 22, 1951     H. B. RUDOLPH     2,554,348
SHEAVE ASSEMBLY

Filed Dec. 1, 1947     2 Sheets-Sheet 2

Inventor
Henry B. Rudolph
By Joe E. Edwards
Attorney

Patented May 22, 1951

2,554,348

UNITED STATES PATENT OFFICE 2,554,348

SHEAVE ASSEMBLY

Henry B. Rudolph, Denver, Colo.

Application December 1, 1947, Serial No. 789,053

8 Claims. (Cl. 287—52.06)

This invention relates to new and useful improvements in sheave assemblies.

The invention relates particularly to sheaves of the grooved type generally employed in single or multiple V-belt power transmission drives and contemplates an improved mounting arrangement which facilitates the mounting of the sheave on a shaft of any length but which is exceptionally applicable to the short stub extensions used in present day practice on electric motors, internal combustion engines, clutch shafts and the like.

One object of the invention is to provide an improved sheave assembly including a bushing or hub element which may be first properly located on the shaft with subsequent mounting of the sheave thereon, or if conditions dictate, may first be installed in the sheave with a subsequent mounting of the sheave and bushing unit on the shaft, whereby the assembly is extremely versatile in its application to various types of installations.

An important object of the invention is to provide an improved sheave assembly wherein the bushing or hub element on which the sheave is arranged to be mounted does not have the usual annular flange or extension as an integral part thereof, whereby a closer mounting position of the sheave adjacent a motor or other housing is possible.

Another object of the invention is to provide an improved sheave assembly having a bushing adapted to be mounted on a shaft with the sheave arranged to mount on the bushing, said sheave being readily removable from the bushing at any time without disturbing the mounting of the bushing on the shaft; the mounting of said bushing on said shaft being such that the same may be re-adjusted or relocated on the shaft without removal of the sheave from the bushing, whereby more accurate alignment of the sheave may be obtained.

A particular object of the invention is to provide an improved sheave assembly wherein a split bushing is employed and also wherein co-acting tapered surfaces on the bushing and on the sheave are utilized to clamp the bushing to a shaft, together with improved means for drawing the tapered surfaces together to firmly mount the parts and for separating said surfaces to dismantle the assembly, whereby mounting and dismounting of the assembly is facilitated.

Still another object of the invention is to provide an improved sheave assembly, of the character described, wherein the usual annular flange or extension of the bushing is a separate element which is adapted to be detachably secured to the bushing after the sheave is mounted thereon; the detachable flange element making possible the use of an extremely simple screw means for tightening or loosening the assembly to install or remove the same, as the case may be.

A still further object of the invention is to provide an assembly, of the character described, wherein the detachably mounted annular flange of the bushing is adjustable with respect to the bushing and sheave, whereby an increased pull on said bushing during installation may be had to permit efficient mounting of the bushing on an undersize shaft; the arrangement also functioning to assure separation of the parts when the sheave is to be removed.

The construction designed to carry out the invention will be hereinafter described together with other features of the invention.

The invention will be more readily understood from a reading of the following specification and by reference to the accompanying drawing, wherein an example of the invention is shown, and wherein.

Figures 1, 2:
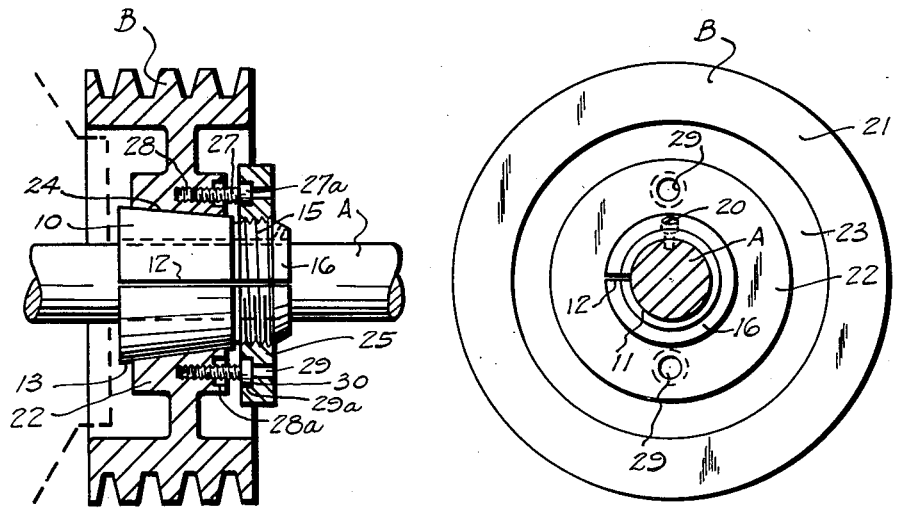
Figure 1 is a transverse, sectional view of a sheave assembly, constructed in accordance with the invention and showing the same mounted on a shaft.
Figure 2 is an end elevation thereof.
Figures 9, 10, 11:
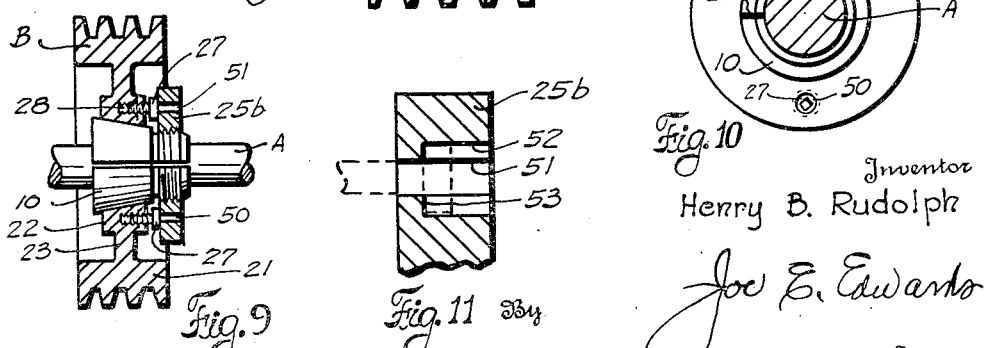
Figure 5:
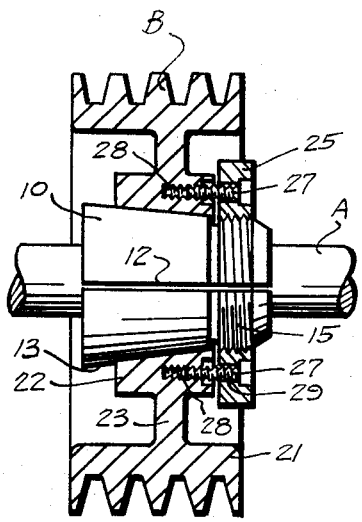
Figure 6:
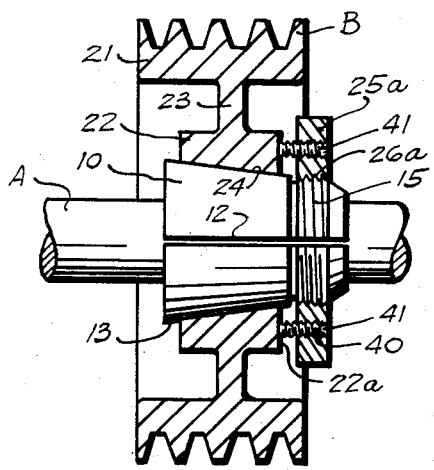
Figure 7:
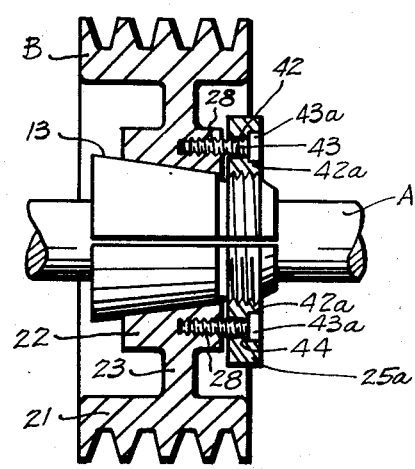
Figure 8:
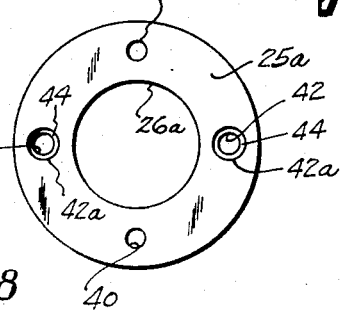

Figure 5 is a similar view, illustrating the method of separating the sheave and bushing, Figure 6 is a transverse, sectional view of a modified form of the invention showing the sheave and bushing in mounted position, Figure 7 is a similar view illustrating the position of the parts when the sheave and bushing are being separated, Figure 8 is a face view of the removable ring of the form of invention shown in Figures 6 and 7, Figure 9 is a transverse, sectional view similar to Figure 1 and illustrating still another form of the invention, Figure 10 is a face view of the annular ring or flange element used in this form, and Figure 11 is an enlarged, sectional detail taken on the line 11—11 of Figure 10.

In the drawings, the numeral 10 designates an elongate bushing or hub element which is formed with an axial bore 11 extending entirely therethrough. The bushing is split longitudinally on one of its radii, as indicated at 12, whereby said bushing may be quickly and easily mounted upon a rotatable shaft A. The external surface of the bushing has a portion thereof tapered and this taper 13 is illustrated as extending from one end of said bushing to a point adjacent an annular groove 14. Beyond the groove, the bushing is provided with external screw threads 15 and beyond the threads, the end of the bushing is beveled as illustrated at 16. The bushing is adapted to be engaged over the shaft A and a longitudinal keyway 17 is formed within its bore, whereby the bushing may be rotatably coupled to a longitudinal key 18 mounted within a groove 19 provided in the external surface of the shaft. For securing the bushing on the shaft against longitudinal displacement thereof, a set screw 20 is threaded through the beveled end 16 of the bushing and has its inner end engaging the key.

A sheave B, which may be of any desired type but which is shown as a multiple groove sheave, is arranged to be mounted on the bushing or hub element 10 and this sheave includes the usual annular rim 21 and a central mounting collar 22 which is connected to the rim by an annular web portion 23. The bore 24 of the collar is tapered so as to engage the tapered surface 13 of the bushing and as is clearly illustrated in Figure 3, after the bushing has been located on the shaft A, the sheave may be engaged over the shaft and then over the bushing. It will be noted that the enlarged end of the tapered bore 24 is directed inwardly so that the collar 22 may be readily engaged over the threaded end of the bushing and may slide into engagement over the tapered portion 13 of said bushing.

Figure 3:
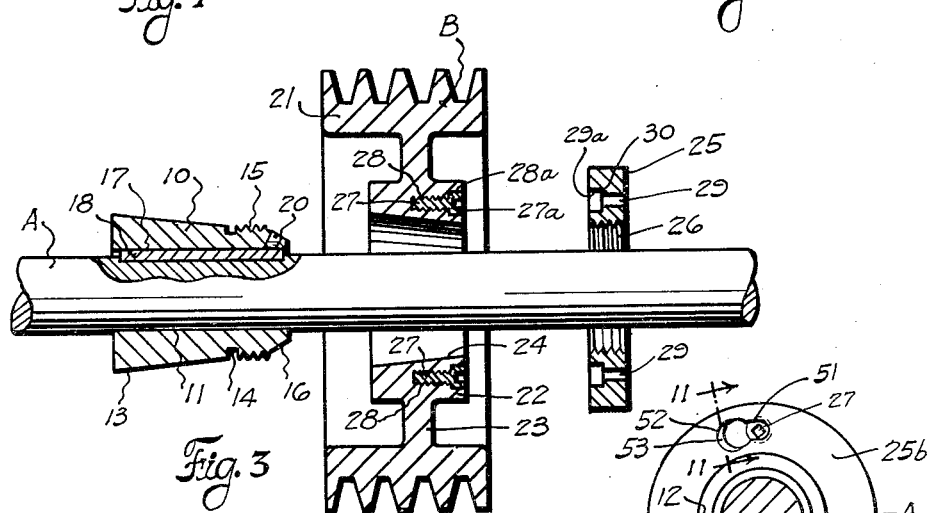
Figure 3 is a view, illustrating the various parts of the assembly separated from each other on the shaft prior to their being mounted as shown in Figure 1.

Because the bushing or hub element 10 is split, the engagement of the tapered bore of the collar with the co-acting tapered surface 13 of the bushing will result in the bushing being clamped firmly onto the shaft A. In order to effect a tight engagement of the tapered bore 24 with the bushing so as to securely clamp the bushing onto the shaft and also to provide a press fit between the collar 22 and the bushing, an annular ring or flange element 25 is provided. The axial bore or opening through the ring is provided with internal screw threads 26 which are adapted to engage the screw threads 15 of the bushing. Thus, after the sheave B has been engaged over the bushing 10, the threads 15 of the bushing are exposed, whereby the ring 25 may be engaged over the shaft A and then connected by the co-acting threads 26 and 15 to the bushing 10 to form a part thereof. It will be evident that it is desirable to firmly force the tapered bore 24 of the collar 22 onto the tapered surface of the bushing and for this purpose a pair of cap screws 27 are threaded into openings 28 which are provided in the collar 22. The openings 28 have an enlarged counterbore 28a at their outer ends for normally receiving the enlarged heads 27a of the cap screws 27. Thus, when the sheave B is first placed into position on the bushing, the cap screws 27 are in their inner position within the threaded openings 28, as shown in Figure 3.

After the sheave is mounted on the bushing and the ring 25 has been connected to said bushing, the cap screws 27 are backed out of the openings 28, this being possible by the insertion of a suitable wrench through access openings 29 which extend through the ring 25. The inner end of each opening 29 is formed with an enlarged counterbore 29a, whereby an internal shoulder 30 is formed within said opening. Therefore, when the screws 27 are backed outwardly of their openings 28, the enlarged head 27a of each screw engages the internal shoulder 30 of its respective opening 29. It will be evident that continued movement of the screws 27 outwardly of the collar will exert a pressure which will move the flange element or ring 25 outwardly away from the collar 22. Since the ring 25 is attached to the bushing 10 by the screw threads 15 and 26, an outward movement of the bushing with respect to the collar 22 will occur. Thus, in Figure 1, the bushing will be moved in a direction to the right, while the collar 22 will be moved in a direction to the left, whereby a tighter wedging action of the tapered surfaces 24 and 13 of the collar and bushing, respectively, will be obtained. This wedging action will result in a complete tightening of the bushing 10 around the shaft A and will also result in a press fit between the bushing and sheave. Therefore, rotation of the shaft will impart a rotation to the sheave.

In order to obtain accurate alignment of the sheave, it will be evident that the set screw 20 may be loosened after the sheave has been mounted on the bushing so that the complete unit may be adjusted longitudinally of the shaft A. This makes it possible to obtain accurate alignment without having to dismantle the entire assembly. Although it is desirable that the key 18 be employed to assure a rotatable connection between the shaft and the pulley, such key may be eliminated since it has been found that a sufficient clamping action may be obtained between the bushing and the shaft to assure efficient rotation of the sheave upon a rotation of the shaft. Thus, it is to be understood that although the key 18 is preferable, it is not essential to the invention.

It is also pointed out that the bushing 10 has been described as first mounted upon the shaft, after which the sheave B has been described as engaged thereover. However, if desired, the sheave may first be mounted on the bushing and the ring or flange element 25 then connected to the bushing. The entire unit, thus assembled may then be placed upon the shaft A as a unitary structure.

Figure 4:
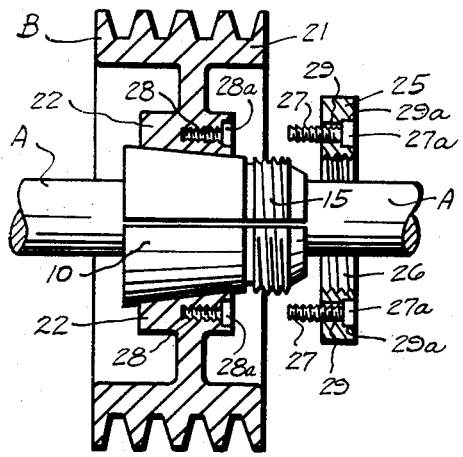
Figure 4 is a view, similar to Figure 1, illustrating the annular ring reversed preparatory to separating the bushing from the sheave.

In order to remove the sheave for replacement or for any other reason, the ring or flange element 25 is disconnected or unscrewed from the bushing 10. The screws 27 are then removed from their respective openings 28. The ring or flange element 25 is then reversed so that the counterbored ends 29a thereof are directed outwardly with respect to the sheave, as shown in Figure 4, rather than inwardly as illustrated in Figure 1. The screws 27 are then inserted through the openings 29 with their heads 27a disposed within the enlarged counterbores 29a of the openings. The ring or flange element 25 is then re-engaged or rethreaded onto the bushing in this reversed position and the screws 27 are again engaged with their respective threaded openings 28. By tightening the screws 27 into the openings of the collar 22, it will be evident that the flange or ring 25 will be pulled inwardly toward the collar 22; since this ring is attached to the bushing, this will result in moving the bushing in a direction to the left in Figure 5 and pulling the sheave in a direction to the right in this figure, whereby the tapered surfaces 24 and 13 are moved toward a disengaged or separated position. Thus, the screws 27 when mounted in the reversed ring or flange may be utilized to effect a separation of the sheave from the bushing. It will be evident that after the press fit between the tapered surfaces has been loosened, the screws 27 and ring 25 are removed, after which the sheave B may be readily withdrawn or disengaged from the bushing.

From the foregoing it will be seen that a simple and efficient sheave structure is provided. The assembly lends itself to use in various types of installations since the bushing 10 may be first mounted on the shaft with the sheave then engaged thereover; if desired, the bushing and sheave may be assembled first and then the entire unit mounted on the shaft. Also, the bushing may be adjusted longitudinally of the shaft without the necessity of removing the sheave B from said bushing, this being true regardless of whether or not the key 18 is employed. The use of the ring or annular flange element 25 makes it possible to provide a bushing which is completely free of flanges upon installation, whereby the sheave may be mounted in a closer relative position to a motor housing or the like, such housing being indicated in dotted lines in Figure 1. The use of the removable ring also is particularly advantageous since it permits the two screws 27 to be employed not only for tightening the sheave on the bushing but also for removing the same, as is illustrated in Figure 5. As above described, the removal is accomplished by merely securing the flange to the bushing in a reversed position. By being able to employ the two screws 27, said screws may be initially mounted within the sheave B, as shown in Figure 3, so as to form a part of said sheave and thereby facilitate shipping of the sheave without danger of losing the particular screws.

The major feature of the invention lies primarily in the removable flange element or ring 25 and a slightly modified form of the invention is illustrated in Figures 6 to 8. In this form the bushing 10 is arranged to receive the sheave B in the manner hereinbefore described. A flange element or ring 25a is substituted for the ring 25 and has its central opening formed with screw threads 26a which are arranged to mount on the threads 15 of the bushing. The ring 25a is formed with a pair of diametrically opposed screw threaded openings 40 within which tightening screws 41 are mounted. When the assembly is mounted on the shaft A, the screws 41 are adapted to be tightened so that their inner ends engage the face 22a of the collar 22 of the sheave B. It will be obvious by observing Figure 6 that a tightening of the screws 41 within their respective openings 40 will cause the screws to exert a pressure which will urge the flange element or ring 25 away from the face of the collar 22. Since the flange 25a is connected and forms part of the bushing 10, said bushing will be moved in a direction to the right in Figure 6, with the sheave being moved in a direction to the left, whereby a tighter wedging action between the tapered surfaces 24 and 13 is effected.

For accomplishing a separation of the sheave from the bushing in this form of the invention, the ring 25a is provided with additional smooth or unthreaded openings 42 which are located diametrically opposite each other and which are spaced in a plane at a right angle to the plane of the openings 40 (Figure 8). Cap screws 43 having heads 43a and similar in construction to the screws 27 of the first form are arranged to be inserted through the openings 42 with their heads engaged within a counterbore 42a and engaging an internal shoulder 44 within each opening. The screws 43 are adapted to thread into the threaded openings 28 which are formed in the collar 22 of the sheave B and it will be evident that the screws 42 when tightened within the openings 28 will serve to separate the sheave from the bushing in the same manner as has been described with reference to the first form.

In the modification of the invention shown in Figures 6 to 8, it is not necessary to remove the ring or flange element 25a and to re-attach it to the bushing in a reversed position in order to effect separation of the sheave from the bushing. However, in this form a separate set of tightening screws and loosening screws must be provided, whereas in the first form the single set of screws may be utilized to both tighten and loosen the sheave on the bushing. Both forms, however, have the important feature of a removable flange or ring which is not attached to the bushing until after the sheave is mounted in position on said bushing. This is exceptionally desirable since it permits a close mounting position of the bushing with respect to a motor or other housing and also makes possible the easy removal of the sheave without removal of the bushing from the shaft. Although the ring or flange element 25 has been illustrated and described as connected to the bushing by means of screw threads, it is obvious that other methods of attachment, such as a bayonet slot arrangement, could be employed. Also, as pointed out the use of the key 18 for rotatably connecting the bushing and shaft is optional; similarly, it may be desirable to employ a key connection between the bushing 10 and the sheave collar 22. In both forms heretofore described, diametrically opposed openings for co-acting with the screws have been illustrated; however, it has been found that only a single opening and a single screw may be employed and will permit a tightening and loosening of the assembly. Thus, in the first form only a single access opening 29 and a single screw 27 need be provided while in the form shown in Figures 6 to 8 one tightening screw 40 and only a single loosening screw 42 need be used. It will, of course, be obvious that by using the diametrically opposed openings and screws, a better operation will be had since there will be no tendency to obtain a binding or cocking action.

In the form shown in Figures 1 to 5, the flange element or ring 25 must be reversed in order to permit the same screws 27 to effect an operation of the bushing from the sheave; that is, the ring 25 must be unscrewed from the bushing, the screws 27 removed, after which the ring 25 is reversed and the screws introduced through the openings as illustrated in Figures 4 and 5. In Figures 9 to 11 another modified form of the invention is shown, wherein it is not necessary to remove the annular flange element or ring. In this case, a ring or flange element 25b is adapted to thread onto the bushing 10 exactly as in the other forms. The collar of the sheave B has the cap screws 27 threaded into the openings 28 as illustrated in the first form shown in Figure 1. The ring element 25b is formed with an access opening 50 which is smaller than the head of the cap screw 27 and is only large enough to receive the wrench which will engage the usual wrench socket in the cap screw. Diametrically opposite the opening 50 is a slot 51 which has a transverse width substantially the same as the diameter of the opening 50, whereby the head of the cap screw 27 cannot pass through the major portion of the slot. At one end the slot is enlarged as shown at 52 and adjacent this enlarged end a shoulder 53 is formed.

In the operation of this form, the ring is attached to the bushing and the opening 50 is aligned with one of the screws 27 which aligns the narrow portion 51 of the slot with the other cap screw. This permits a wrench to be inserted through the opening 50 and slot 51 respectively, to engage the sockets within the heads of the cap screws, whereby said screws may be backed outwardly of the openings 28. Such unscrewing of the screws 27 causes the heads thereof to engage the inner surface of the flange element or ring 25b to urge the ring and bushing outwardly with respect to the sheave to tighten said bushing within the bore of the sheave collar.

When it is desired to separate the parts, it is only necessary to return the screws into position within their respective openings 28 and then screw the flange inwardly of the bushing. The enlarged end 52 of the slot 51 is then aligned with one of the cap screws and by backing said screw outwardly through this enlarged portion, the head of the cap screw may move outwardly of the shoulder 53 which surrounds the enlarged opening 52. After the lower portion of the head has cleared this shoulder, a slight rotation of the ring moves the shoulder beneath the head of the cap screw, as indicated in Figure 11. After this engagement, a rotation of the screw, threading it back into its opening 28 will pull the flange and bushing inwardly toward the sheave to release the tight fit between the bushing and tapered bore of the collar. Thus, it becomes obvious that it is not necessary to remove the flange 25b to effect separation of the parts. It is pointed out that although only one key slot 51 and 52 is shown in the ring 25, two such slots may be employed with the other one being substituted for the opening 50. It is also ponted out that in this form the head of the cap screw engages the inner surface of the ring or flange element, rather than engaging within a counterbored portion of the opening, as in the form shown in Figure 1. Therefore, it is evident that the counterbore shown in Figure 1 could be eliminated so that during the tightening operation, the cap screw heads may engage the inner surface of the flange 25, rather than engaging within a counterbore as illustrated. In any event the counterbore of Figure 1 is eliminated, loosening of the parts, as shown in Figures 4 and 5 would be effected by engagement of the cap screw head with the inner surface of the ring or flange element 25.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A sheave assembly including a bushing adapted to be mounted on a shaft and having a portion of its outer surface tapered, a sheave formed with a collar at its center with said collar having a tapered bore for fitting over the tapered portion of the bushing, movement of the collar in one direction relative to the bushing effecting a press friction connected between the collar and bushing and movement of the collar in an opposite direction relative to the bushing loosening the frictional connection between said collar and bushing, one end of the bushing extending beyond the collar, an annular element secured to the extending end of the bushing, and operating means movable inwardly and outwardly of said collar, said means being engageable upon operation in one direction with the inner adjacent surface of the annular element for moving the collar and element with respect to each other in a direction which will effect a press frictional connection therebetween, the annular element being detachable and reversible on the end of said bushing to dispose that side of the element which was engaged by the threaded means in making the frictional connection outwardly, said operating means being engageable with said outwardly disposed side of said element whereby operation of said means in a reverse direction effects movement of the collar and element in a direction to loosen the frictional engagement between said collar and the bushing.

2. An assembly as set forth in claim 1, wherein the bushing is split along one of its radii, whereby when the collar is drawn onto the tapered portion of the bushing said bushing is firmly clamped onto the shaft.

3. An assembly as set forth in claim 1, wherein the bushing is keyed to the shaft and also wherein a set screw means is provided for locking the bushing to the key, whereby longitudinal adjustment of said bushing relative to the shaft is possible.

4. An assembly as set forth in claim 1, wherein the annular element is detachably connected to the bushing by means of screw threads.

5. A sheave assembly including a bushing adapted to be mounted on a shaft and having a portion of its outer surface tapered, a sheave formed with a collar at its center with said collar having a tapered bore for fitting over the tapered portion of the bushing, movement of the collar in one direction relative to the bushing effecting a press friction connection between the collar and bushing and movement of the collar in an opposite direction relative to the bushing loosening the frictional connection between said collar and bushing, an annular element having an access opening therein and detachably secured to one end of the bushing, a screw threaded into the sheave collar and movable inwardly and outwardly thereof, said screw being accessible through the opening and being adapted to engage the adjacent inner surface of the annular element upon outward movement of the screw with respect to the collar, whereby as the screw is moved outwardly of the collar, the collar and element are moved in a direction relative to each other to provide a frictional connection between the collar and bushing, and element being detachable and reversible on the end of the bushing and said screw being adapted to extend through the access opening thereof after the element is reversed and also being adapted to engage the outer surface to the element which is not adjacent the collar, whereby movement of the screw inwardly of the sheave collar illustrates said collar and element with respect to each other in a direction to loosen the frictional connection therebetween.

6. A sheave assembly including a bushing adapted to be mounted on a shaft and having a portion of its outer surface tapered, a sheave formed with a collar at its center with said collar having a complementary tapered bore for fitting over the tapered portion of the bushing, a reversible annular element detachably secured to one end of the bushing, and rotatable screw means threaded within the sheave collar and movable inwardly and outwardly thereof, said screw means being engageable with the inner adjacent surface of the annular element when moved outwardly of the collar to urge the annular element away from the collar, reversal of the annular element permitting the screw to engage the outer surface of said element whereby inward movement of the screw with respect to the sheave collar draws the element toward said collar.

7. A sheave assembly including a bushing adapted to be mounted on a shaft and having a portion of its outer surface tapered, a sheave formed with a collar at its center with said collar having a tapered bore for fitting over the tapered portion of the bushing, an annular ring removably secured to one end of the bushing, said ring having a pair of access openings extending therethrough with said openings being counterbored to form an annular shoulder within each opening, and cap screws threaded into the sheave collar and extending into the openings to engage the shoulders therein, whereby the screws may be utilized to urge the bushing and sheave collar into tight engagement with each other, removal of the ring from the bushing and screws from the collar permitting replacement of the ring in a reversed position, whereby the screws may then extend entirely through the access openings and again engage said shoulders and thread into the collar so that said screws may be utilized to separate said sheave collar from the bushing.

8. A sheave assembly including a bushing adapted to be mounted on a shaft and having a portion of its outer surface tapered, a sheave formed with a collar at its center with said collar having a tapered bore for fitting over the tapered portion of the bushing, an annular ring adapted to be removably secured to one end of the bushing, said ring having an arcuate key slot extending therethrough, a shoulder adjacent to the enlarged portion of the key slot, and a cap screw threaded into the sheave collar and adapted to engage the inner surface of the ring, whereby when the cap screw is rotated to move outwardly, it will exert an outward pressure against the ring and the bushing with respect to the sheave collar, alignment of the enlarged portion of the key slot with the cap screw permitting said screw to be backed outwardly therethrough so that its head clears the shoulder adjacent said enlarged portion, whereby a rotation of the ring may move said shoulder beneath the head of said cap screw so that subsequent inward movement of said screw will draw the ring and bushing inwardly of the sheave collar.

HENRY B. RUDOLPH.

REFERENCES CITED

The following references are of record in the file of this patent:

UNITED STATES PATENTS

| Number | Name | Date |
|---|---|---|
| 2,407,032 | Myers | Sept. 3, 1946 |